United States Patent
Sim et al.

(10) Patent No.: US 7,215,505 B2
(45) Date of Patent: May 8, 2007

(54) POLE BASE ASSEMBLY FOR MAGNETIC RECORDING/REPRODUCING APPARATUS

(75) Inventors: Jae-hoon Sim, Suwon (KR); Hyeong-seok Choi, Suwon (KR); Byeong-bae Park, Ansan (KR)

(73) Assignee: Samsung Electronics Co., Ltd., Suwon, Gyunggi-do (KR)

( * ) Notice: Subject to any disclaimer, the term of this patent is extended or adjusted under 35 U.S.C. 154(b) by 381 days.

(21) Appl. No.: 10/640,665

(22) Filed: Aug. 14, 2003

(65) Prior Publication Data

US 2004/0150908 A1    Aug. 5, 2004

(30) Foreign Application Priority Data

Sep. 2, 2002    (KR)    ............... 2002-52623

(51) Int. Cl.
*G11B 15/61*    (2006.01)
*G11B 16/665*    (2006.01)

(52) U.S. Cl. ............ 360/85; 360/95; 360/130.21

(58) Field of Classification Search .......... 360/85, 360/95, 130.21, 130.22, 130.23, 130.2
See application file for complete search history.

(56) References Cited

U.S. PATENT DOCUMENTS

| | | | | |
|---|---|---|---|---|
| 4,122,506 A | * | 10/1978 | Kubo et al. | 360/130.23 |
| 5,307,219 A | * | 4/1994 | Haba | 360/85 |
| 5,794,874 A | * | 8/1998 | Setsumasa et al. | 242/346.1 |
| 6,736,351 B2 | * | 5/2004 | Sim et al. | 242/615.21 |
| 2002/0085306 A1 | | 7/2002 | Matsuoka | |

FOREIGN PATENT DOCUMENTS

| | | | |
|---|---|---|---|
| EP | 0 127 447 | | 12/1984 |
| EP | 0 192 448 | | 8/1986 |
| EP | 0 613 132 | | 8/1994 |
| JP | 58-200460 | | 11/1983 |
| JP | 60-32154 | | 2/1985 |
| JP | 60032154 A | * | 2/1985 |
| JP | 62139164 A | * | 6/1987 |
| JP | 63-32322 | | 3/1988 |
| JP | 63241748 A | * | 10/1988 |
| JP | 02021452 A | * | 1/1990 |
| JP | 2-91846 | | 3/1990 |
| JP | 5-20750 | | 1/1993 |
| JP | 5-135443 | | 6/1993 |
| JP | 6-139661 | | 5/1994 |
| JP | 8-315465 | | 11/1996 |
| JP | 9-63159 | | 3/1997 |

* cited by examiner

*Primary Examiner*—William J Klimowicz
(74) *Attorney, Agent, or Firm*—Roylance, Abrams, Berdo & Goodman, L.L.P.

(57) ABSTRACT

A pole base assembly for a magnetic recording/reproducing apparatus for guiding a tape drawn from a reel through a predetermined path in parallel or substantially in parallel toward a lead surface of a head drum. The pole base assembly comprises a pole base disposed to approach and retreat from a side of the head drum when the tape is loaded and unloaded, respectively, a sloping pole disposed to be sloped on the pole base, to be parallel or substantially parallel to the lead surface of the head drum, for guiding the tape fed to the head drum at a predetermined angle, to be parallel to the lead surface, and a supporting holder disposed on the pole base, and having a sloping part to support the sloping pole to be inclined at a predetermined angle.

20 Claims, 6 Drawing Sheets

POLE BASE ASSEMBLY FOR MAGNETIC RECORDING/REPRODUCING APPARATUS

This application claims benefit under 35 U.S.C. § 119 from Korean Patent Application No. 2002-52623, filed on Sep. 2, 2002, the entire content of which is incorporated herein by reference.

BACKGROUND OF THE INVENTION

1. Field of the Invention

The present invention relates to a magnetic recording/reproducing apparatus, and more particularly, to a pole-base assembly for a magnetic recording/reproducing apparatus, for guiding a tape which is released from a tape cassette and loaded in contact with a head drum.

2. Description of the Related Art

Generally, a magnetic recording/reproducing apparatus is a device for recording information on a recording medium such as a magnetic tape, and reproducing the recorded information. There are several types of magnetic recording/reproducing apparatus, namely, a VCR (Video Cassette tape Recorder), a camcorder, and so on.

A magnetic recording/reproducing apparatus typically comprises a main deck at which a head drum is rotatably disposed, a main sliding member movably disposed to slide laterally on the main deck, a sub-deck movably disposed to slide longitudinally on the main deck, a moving means for moving a cassette tape inserted into the sub-deck to a predetermined position in the main deck, and a reel table for receiving two tape reels of the cassette tape and driven to wind one tape reel. The head drum is rotatably disposed at the main deck to record/reproduce information on a tape. The apparatus further comprises a tape loading means for loading the tape on the head drum, and a tape guide device.

FIG. 1 shows an example of a tape guide device. The tape guide device comprises an entrance pole base assembly 20 and an exit pole base assembly 30 for guiding the tape T at both sides of the head drum 10 to drive around the head drum 10, and a plurality of guideposts 41, 42, 43, 44. The guideposts 41 and 42 are fixed to the main deck 1, and the other guideposts 43 and 44 are moved in the main deck 1 to guide the driving of the tape T and to adjust tension.

The pole-base assemblies 20, 30 are moved along a direction A by a predetermined moving means to guide the driving of the tape T. Since the head drum 10 is disposed at a predetermined slope at the main deck 1, the pole-base assemblies 20, 30 have special construction for guiding the tape T inclined at a predetermined angle as the tape T is being guided along the head drum 10.

Namely, the entrance pole base assembly 20 comprises a pole base 21, a rotation supporting roller 23 and a sloping pole 25, as shown in FIG. 2. Since the head drum is disposed to be sloped, the sloping pole 25 is disposed to be sloped with respect to the rotation supporting roller 23 between the rotation supporting roller 23 and head drum 10 to maintain parallel to the tape T.

With the conventional pole base assembly having the above construction, when the pole base 21 is manufactured by a molding process, a hole for coupling with the sloping pole 25 is bored and then the pole base 21 is press-fit into the hole to be fixedly disposed at a predetermined angle. In this case, the angle of the sloping pole 25 press-fit in the hole is determined by the initial position of the manufactured hole. Therefore, the angle of the sloping pole press-fit in the hole varies according to a manufacturing tolerance of the hole, thereby increasing the likelihood that the sloping pole will be sloped at an incorrect angle, and thus decreasing productivity.

SUMMARY OF THE INVENTION

An object of the present invention is to provide an improved pole base assembly for a magnetic recording/reproducing apparatus.

Another object of the present invention is to provide a pole base assembly having a pole base which supports a sloped pole in an improved manner.

These and other objects are substantially achieved by providing an improved pole base assembly for a magnetic recording/reproducing apparatus for guiding a tape drawn from a reel through a predetermined path toward a lead surface of a head drum. The pole base assembly comprises a pole base disposed to approach and retreat from a side of the head drum when the tape is loaded and unloaded, respectively, a sloping pole, coupled to the pole base and sloped at a sloping angle with respect to the pole base, for guiding the tape fed to the head drum at a predetermined angle, to be substantially parallel to the lead surface, and a supporting holder, disposed on the pole base and configured to support the sloping pole at the sloping angle. The supporting holder comprises a first supporting wall that has a sloping surface for supporting the sloping pole at the sloping angle, and a second supporting wall that has a supporting surface in contact with the supporting wall for supporting the sloping pole.

The first supporting wall has a gradually increasing thickness from an upper end to a lower end. The sloping surface has a width that is greater than the radius of the sloping pole and smaller than the diameter of the sloping pole, and more particularly, the sloping surface has a width that is substantially uniform along the length of the sloping surface. The supporting surface is formed at substantially 90° with respect to the sloping surface, and has a substantially uniform width that is greater than the radius of the sloping pole and smaller than the diameter of the sloping pole.

Furthermore, the second supporting wall has a sub-sloping surface which is in substantially parallel relation with respect to the sloping surface. The supporting holder further includes a bottom surface which is adapted to contact and support a lower end of the sloping pole, and extends at substantially 90° with respect to the sloping surface.

The pole base further has a supporting hole therein and a supporting boss spaced from the supporting hole, such that a first axis X extends from the center of the supporting hole to the center of the supporting boss, a second axis Y extends in line with the center of the supporting hole, and a third axis Z extends in a perpendicular relation with respect to the first axis X and the second axis Y. The sloping pole is located at a direction angle θ with respect to the first axis X. The sloping pole is disposed on the pole base to have a predetermined slope α with respect to another imaginary axis Y' which is in parallel with the second axis Y. In addition, the sloping pole can be bonded to the pole base with adhesive, or can be formed integral with the pole base.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Certain embodiments of the invention will be hereinafter described in detail with reference to the accompanying drawings.

Figure 3:
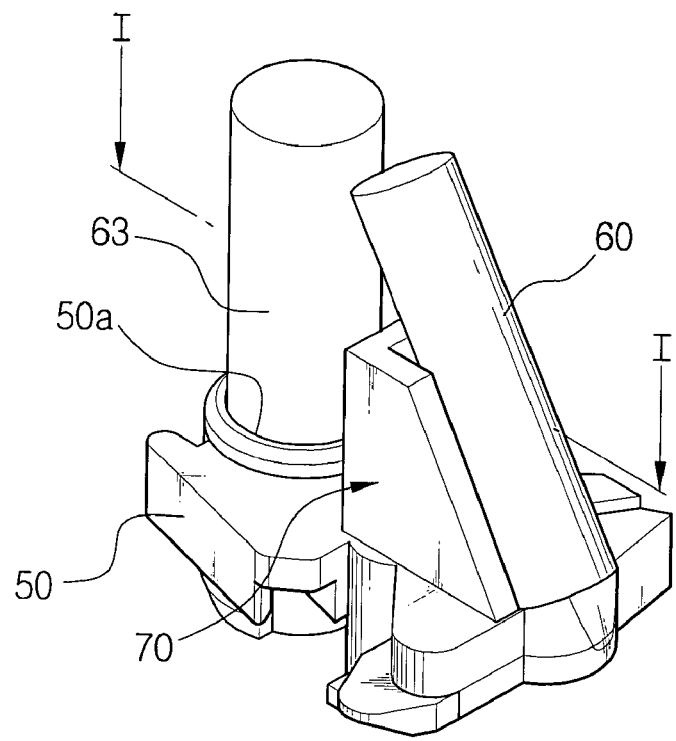
FIG. 3 is a perspective view showing a pole base assembly for a magnetic recording/reproducing apparatus in accordance with an embodiment of the invention.
Figure 4:
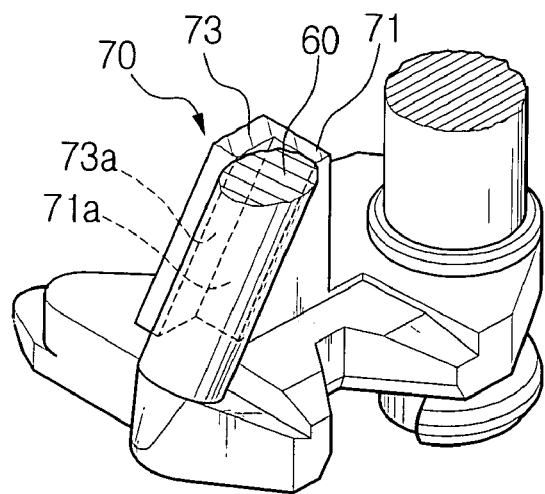
FIG. 4 is a cross-sectional view along a line I—I in FIG. 3.

Referring to FIGS. 3 and 4, a pole base assembly for a magnetic recording/reproducing apparatus in accordance with an embodiment of the invention comprises a pole base 50, a sloping pole 60 disposed to be inclined at a predetermined angle on the pole base 50, and a supporting holder 70 disposed on the pole base 50 for supporting the sloping pole 60 at the predetermined slope.

Figure 5:
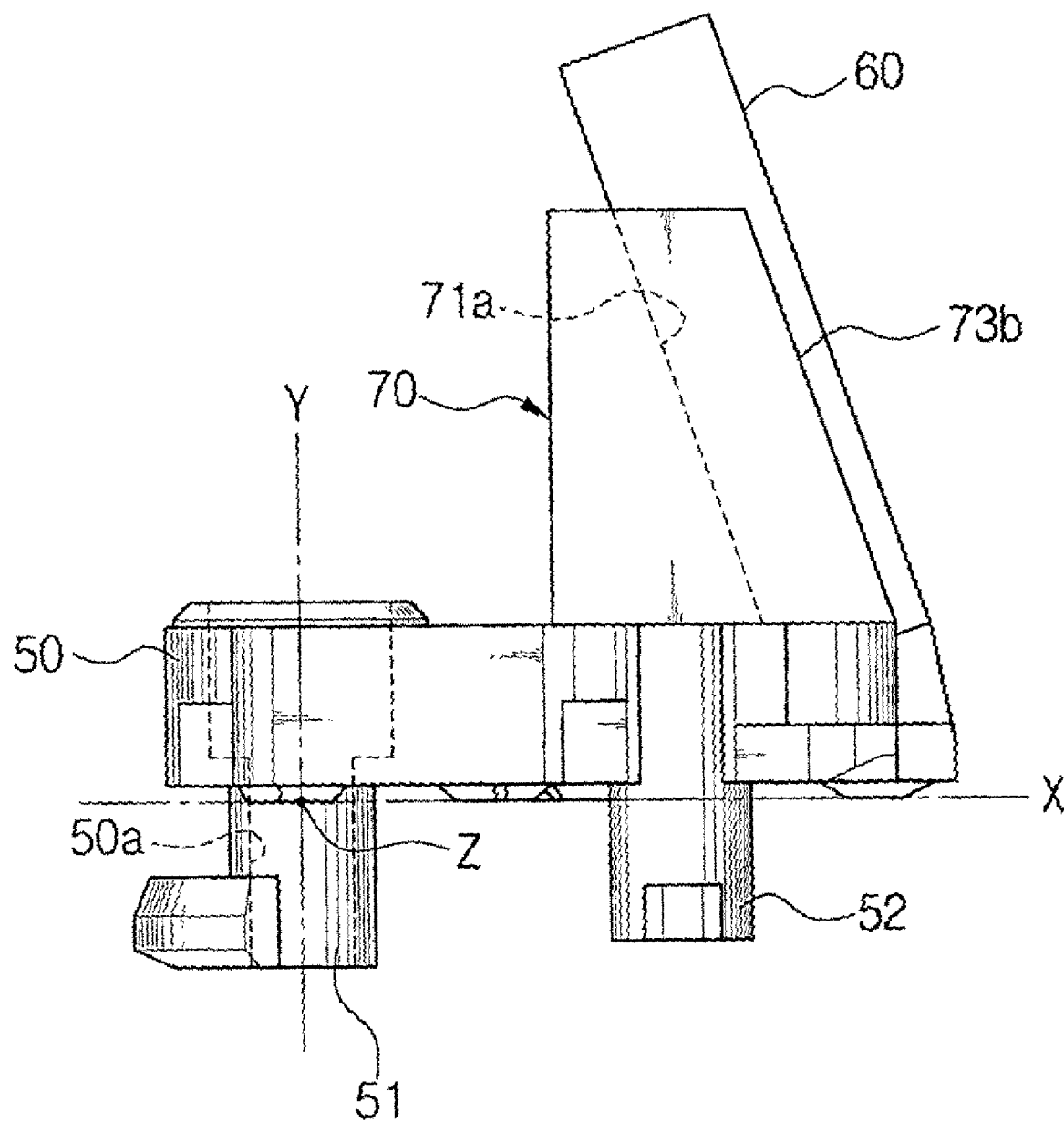
FIG. 5 is a front view of the pole base assembly of FIG. 3.

In loading and unloading of the tape cassette, the pole base 50 advances and retreats in the transverse direction of the head drum along a guide rail that is provided on the deck. To this end, as shown in FIG. 5, the pole base 50 includes a guide protrusion 51 guided along the guide rail during the loading/unloading of the pole base 50 and a supporting boss 52 to which a link unit (not shown) is connected for loading/unloading of the pole base 50. Both the guide protrusion 51 and the supporting boss 52 protrude from the lower surface of the pole base 50, and are spaced apart from each other by a predetermined distance. The loading/unloading of the pole base 50 having the above-described construction is generally known in the art, and accordingly, further description thereof will be omitted.

Further provided on the pole base 50 are a sloping pole 60 and a vertical pole 63 for guiding the tape at a predetermined posture. The vertical pole 63 is connected to a supporting hole 50a formed in the pole base 50, and assembled in a perpendicular or substantially perpendicular relation with respect to the upper surface of the pole base 50. The supporting hole 50a is formed through the center of the guide protrusion 51. The vertical pole 63 may be connected in the supporting hole 50a by a screw or press-fitting. The vertical pole 63 guides the running of the magnetic tape toward the head drum in advance of the guidance of the sloping pole 60.

Figure 1:
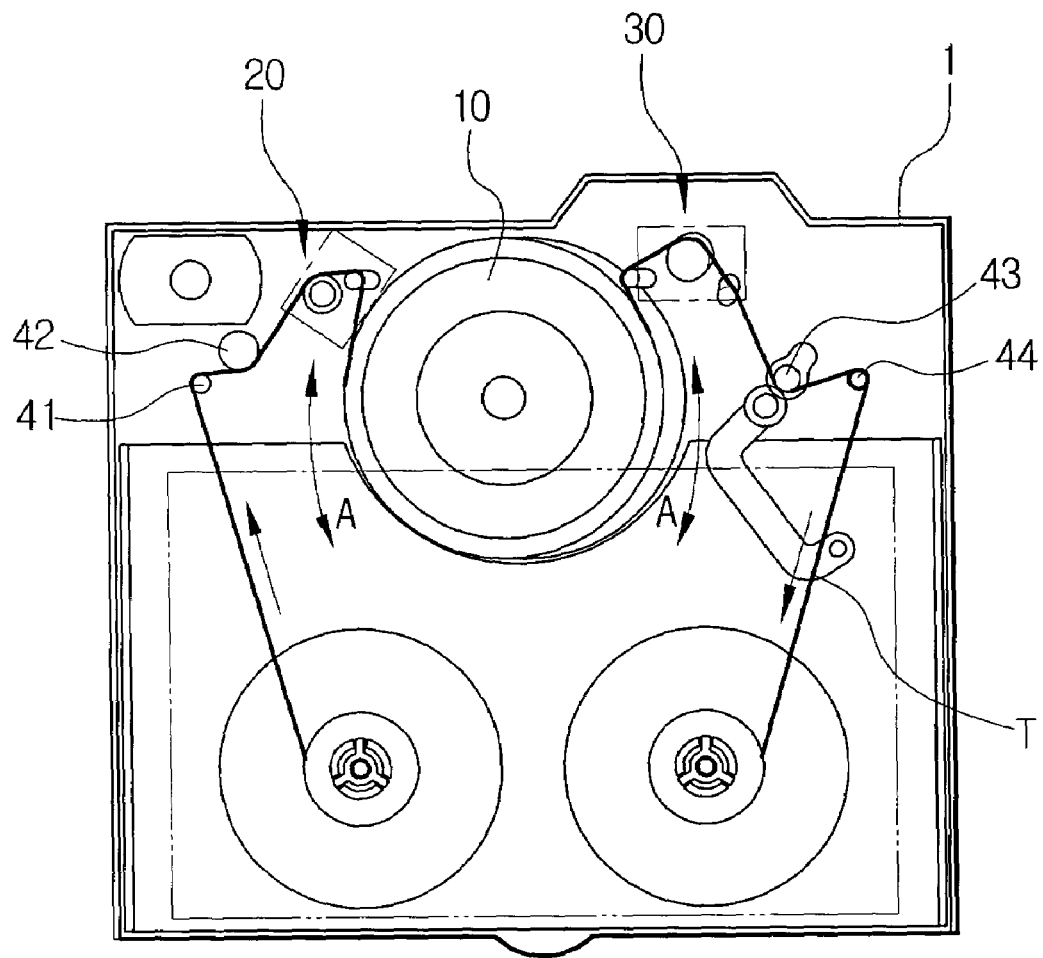
FIG. 1 is a schematic plane view for illustrating a conventional magnetic recording/reproducing apparatus.
Figure 2:
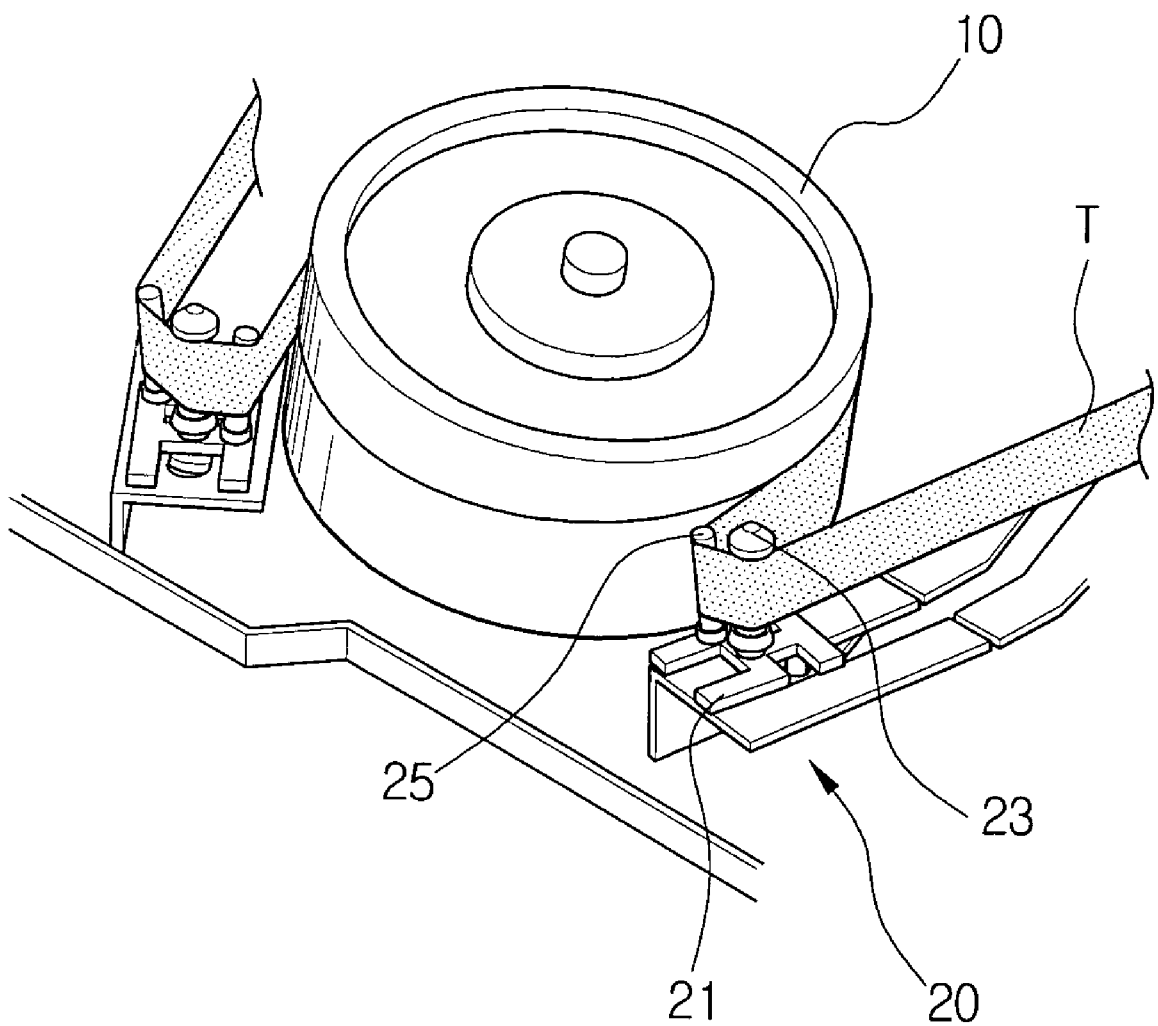
FIG. 2 is a partial perspective view showing important parts of FIG. 1.

The sloping pole 60 is disposed on the pole base 50 at a predetermined slope. As shown in FIG. 2, because the head drum 10 is in an inclined position at a predetermined angle, the sloping pole 60 is accordingly inclined so as to guide the tape in parallel or substantially parallel relation with respect to the lead surface of the head drum 10.

The supporting holder 70 is provided on the pole base 50 to support the pole base 50 at a predetermined slope. The supporting holder 70 includes a first supporting wall 71 that has a sloping surface 71a for supporting the sloping pole 60 at a predetermined angle, and a second supporting wall 73 that has a supporting surface 73a in contact with the supporting wall 71 and for supporting the sloping pole 60.

Figure 6:
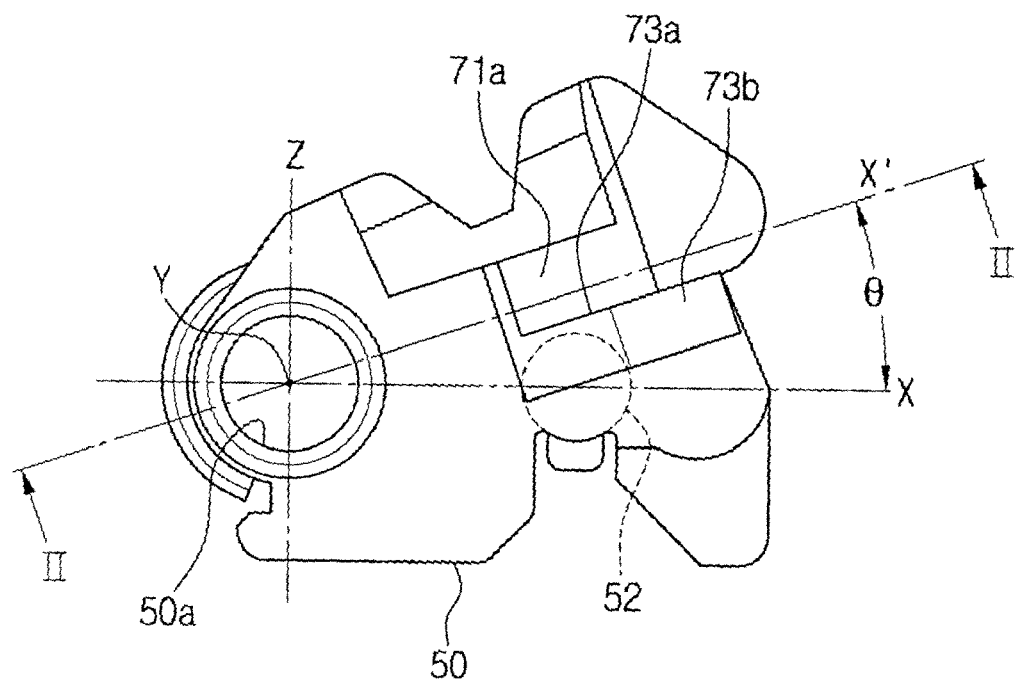
FIG. 6 is a plan view of the pole base assembly of FIG. 3.
Figure 7:
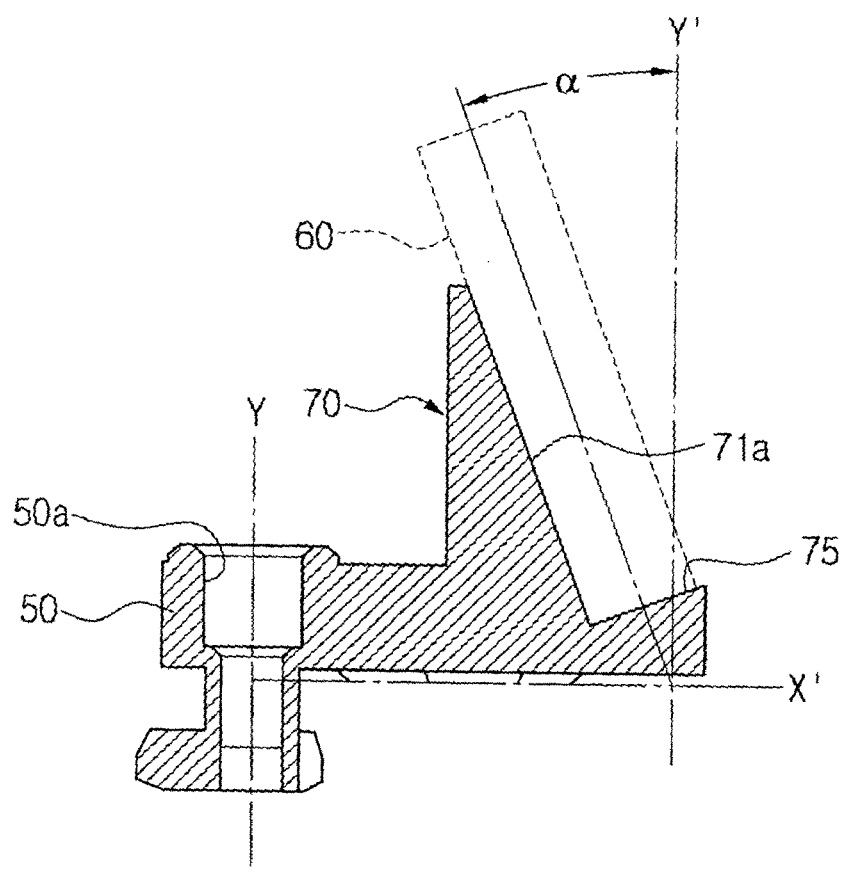
FIG. 7 is a sectional view taken on line II—II of FIG. 6.
Figure 8:
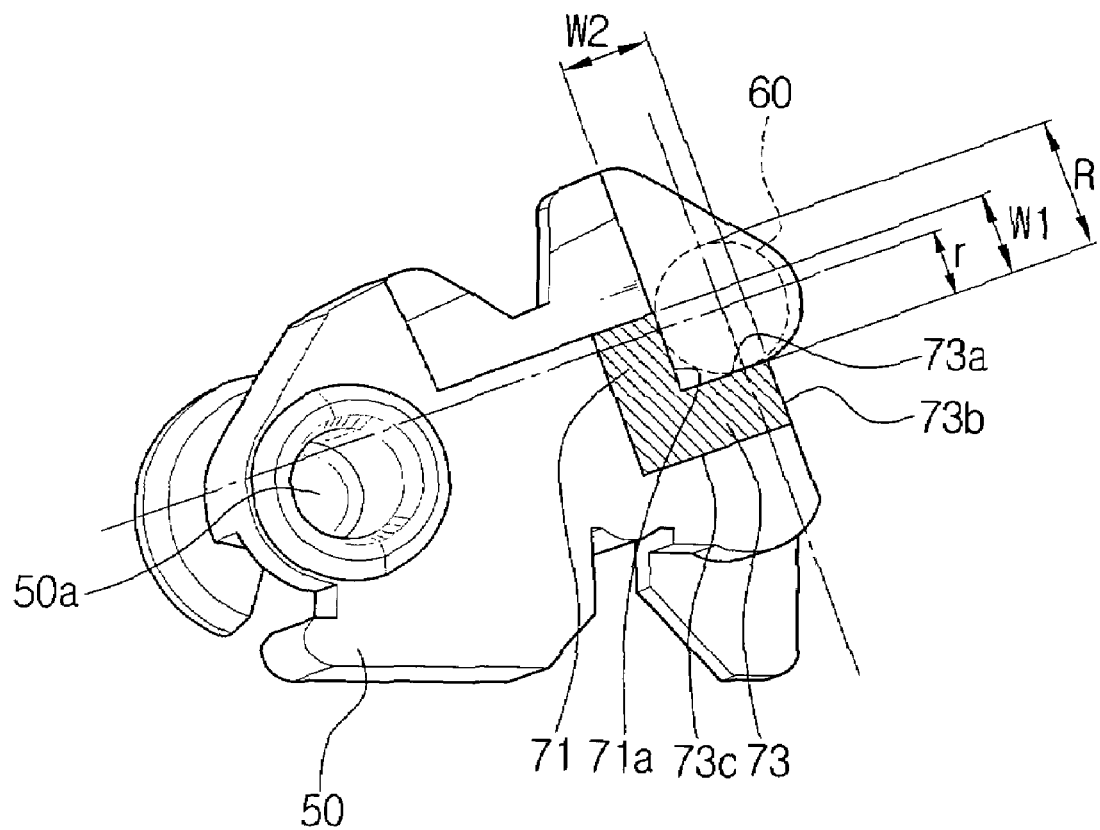
FIG. 8 is a plane view showing the pole base assembly of FIG. 3 from another angle.

Referring now to FIGS. 5 and 6, the structure and position of the supporting holder 70 and the sloping pole 60 will be described with reference to a 3-dimensional coordinate system based on a first axis X extending from the center of the supporting hole 50a to the center of the supporting boss 52, a second axis Y extending in line with the center of the supporting hole 50a, and a third axis Z extending in a perpendicular relation with respect to the first and the second axes X, Y.

In the 3-dimensional coordinate system, the sloping pole 60 is located at a direction angle θ with respect to the first axis X. Also, the sloping pole 60 is disposed on the pole base 50 to have a predetermined slope α with respect to another imaginary axis Y' which is in parallel with the second axis Y. To this end, the sloping surface 71a of the supporting holder 70 is located at the direction angle θ, but at the slope as much as α. The direction angle θ and the slope α may vary in accordance with the slope of the head drum as employed, and thus, they are not strictly limited to certain fixed values.

Meanwhile, for the sake of increasing the supporting force of the sloping pole 60, the first supporting wall 71 that has the sloping surface 71a is formed such that the same has a gradually increasing thickness from the upper end to the lower end. Also, the sloping surface 71a has a width w1 that is greater than the radius r, but smaller than the diameter R of the sloping pole 60. Accordingly, the sloping pole 60 is stably supported in contact with the sloping surface 71a. The sloping surface 71a has the uniform or substantially uniform width w1 along the length thereof, that is, in the direction parallel or substantially parallel with the sloping pole 60.

The sloping surface 71a is formed such that it is in perpendicular relation with respect to a plane connecting the second axis Y and a certain axis x' moved from the first axis X by the direction angle θ.

The second supporting wall 73 has a supporting surface 73a for contact-supporting the sloping pole 60 just as the sloping surface 71a of the first supporting wall 71 does. The supporting surface 73a also has a 'V' shape, which is also the same for the supporting surface 71a. For a more stable support of the sloping pole 60, the supporting surface 73a is formed at 90° or substantially 90° with respect to the sloping surface 71a. Accordingly, the supporting surface 71a crosses the plane of the first and the third axes X, Z in a perpendicular relation. Just like the sloping surface 71a of the first supporting wall 71, the supporting surface 73a has a width w2 that is greater than the radius r, but smaller than the diameter R of the sloping pole 60. The supporting surface 73a also has the uniform width w2 in the parallel direction with respect to the sloping pole 60.

The second supporting wall 73 has a sub-sloping surface 73b which is in parallel or substantially parallel relation with respect to the sloping surface 71a. As the width w2 of the supporting surface 71a of the sub-sloping surface 73b is uniform, the sloping pole 60 is provided at the slope as much as α. By providing the sub-sloping surface 73b, interference of the tape in the supporting holder 70 can be avoided while the tape is guided by the sloping pole 60 supported on the supporting holder 70. The second supporting wall 73 has a predetermined thickness, that is, a predetermined length between the supporting surface 73a and the outer surface 73c opposite to the supporting surface 73a.

Because the sloping pole 60 is supported on two points, that is, on the sloping surface 71a and the supporting surface 73a, the position and posture thereof are determined automatically. The supporting holder 70 further includes a bottom surface 75 to contact-support the lower end of the sloping pole 60. The bottom surface 75 corresponds to the upper surface of the pole base 50, and is provided at a predetermined angle, and preferably at 90°, with respect to the sloping surface 71a. Accordingly, the sloping pole 60 is fixed in position by the close contact with the sloping surface 71a, the bottom surface 75 and the supporting surface 73a. The sloping pole 60 is secured onto the supporting holder 70 by adhesive, such as a bond. Preferably, adhesive is first applied to the sloping surface 71a, the supporting surface 73a and the bottom surface 75, and then the sloping pole 60 is positioned thereon.

It is also preferable to form the supporting holder 70 at a lower height than the sloping pole 60 in an inclined state so that there is no interference. However, the supporting holder 70, that is, the sloping surface 71a may preferably have a length more than a half of the length of the sloping pole 60 so as to secure stable supporting force of the sloping pole 60.

The supporting holder 70 constructed as above may preferably be formed integrally with the pole base 50. This is because, by integrally forming the supporting holder 70 with the pole base 50 through a metal mold or an injection molding, allowances between the sloping surface 71a, the supporting surface 73a and the bottom surface 75 can be maximized.

With the pole base assembly of the tape recorder according to the embodiment of the present invention described above, the sloping pole 60 is supported at a predetermined slope by forming the supporting holder 70 integrally with the pole base 50. Because the position and the posture of the sloping pole 60 are determined by the sloping surface 71a, the supporting surface 73a and the bottom surface 75, assembly can be easily completed without having to use a separate jig or inspection equipment, but simply by bonding the sloping pole 60 onto the supporting holder 70.

Because the sloping pole 60 can be assembled onto the pole base 50 in a desired position and posture, productivity increases, while the defect rate decreases.

Further, by designing the sloping surface 71a, the supporting surface 73a and the bottom surface 75 of the supporting holder 70 based on the 3-dimensional coordinate system that uses the supporting hole 50a and the supporting boss 52 provided to the pole base 50, appropriate design in respect to sizes and dimensions of each part is enabled, and alteration in design becomes easier.

With the pole base assembly of the magnetic recording/reproducing apparatus according to the embodiments of the present invention described above, while the sloping pole is assembled on the sloping surface which is provided on the pole base in advance, the inclination of the sloping pole is automatically determined by the sloping surface. As a result, defect rate decreases and productivity increases.

Although certain embodiments of the present invention have been disclosed for illustrative purposes, those skilled in the art will appreciate that various modifications, additions and substitutions can be made without departing from the scope and spirit of the invention as disclosed in the accompanying claims.

What is claimed is:

1. A pole base assembly for a magnetic recording/reproducing apparatus for guiding a tape drawn from a reel through a predetermined path toward a lead surface of a head drum, the pole base assembly comprising:
    a pole base disposed to approach and retreat from a side of the head drum when the tape is loaded and unloaded, respectively;
    a sloping pole, coupled to the pole base and sloped at a sloping angle with respect to the pole base, for guiding the tape fed to the head drum at a predetermined angle, to be substantially parallel to the lead surface; and
    a supporting holder, disposed on the pole base and configured to support the sloping pole at the sloping angle, the supporting holder having a first planar supporting surface extending from said pole base and having a width less than a diameter of said sloping pole, said first planar supporting surface being at an incline to define an incline of the sloping pole with respect to the pole base, said sloping pole directly contacting said first planar supporting surface.

2. A pole base assembly as claimed in claim 1, wherein the supporting holder comprises:
    a first supporting wall defining said first planar supporting surface and a sloping surface for supporting the sloping pole at the sloping angle.

3. A pole base assembly as claimed in claim 2, wherein the supporting holder comprises a second planar supporting wall that has a supporting surface in contact with the first supporting wall for supporting the sloping pole, said second planar supporting wall contacting said sloping pole.

4. A pole base assembly as claimed in claim 3, wherein: the supporting surface of the second wall is formed at substantially 90° with respect to the plane of the sloping surface.

5. A pole base assembly as claimed in claim 3, wherein: the supporting surface of the second wall has a width that is greater than the radius of the sloping pole and smaller than the diameter of the sloping pole.

6. A pole base assembly as claimed in claim 3, wherein: the supporting surface of the second wall has a substantially uniform width.

7. A pole base assembly as claimed in claim 3, wherein: the second supporting wall has a sub-sloping surface which is in substantially parallel relation with respect to the sloping surface.

8. A pole base assembly as claimed in claim 2, wherein: the first supporting wall having a vertical surface extending substantially perpendicular from said pole base, and wherein the first supporting wall has a gradually increasing thickness from an upper end to a lower end.

9. A pole base assembly as claimed in claim 2, wherein: the sloping surface has a width that is greater than the radius of the sloping pole.

10. A pole base assembly as claimed in claim 2, wherein: the sloping surface has a width that is substantially uniform along the length of the sloping surface.

11. A pole base assembly as claimed in claim 2, wherein: the supporting holder includes a bottom surface which is adapted to contact and support a lower end of the sloping pole, and extends at substantially 90° with respect to the sloping surface.

12. A pole base assembly as claimed in claim 1, wherein: the pole base has a supporting hole therein and a supporting boss spaced from the supporting hole and extending from a bottom side of said pole base, such that a first axis X extends from the center of the supporting hole to the center of the supporting boss, a second axis Y extends axially in line with the center of the supporting hole, and a third axis Z extends in a perpendicular direction with respect to the first axis X and the second axis Y.

13. A pole base assembly as claimed in claim 12, wherein: the sloping pole is located at a direction angle θ with respect to the first axis X.

14. A pole base assembly as claimed in claim 12, wherein:
the sloping pole is disposed on the pole base to have a predetermined slope α with respect to another imaginary axis Y' which is parallel with the second axis Y.

15. A pole base assembly of claim 12, further comprising:
a vertical pole received in said supporting hole and extending substantially perpendicular to said pole base.

16. A pole base assembly as claimed in claim 1, wherein:
the sloping pole is bonded to the pole base with adhesive.

17. A pole base assembly as claimed in claim 1, wherein:
the sloping pole is formed integral with the pole base.

18. A pole base assembly of claim 1, wherein said supporting holder further comprises:
a first supporting wall having a vertical surface extending substantially perpendicular to a plane of said pole base and a surface defining a sloping surface, said sloping surface being at an incline with respect to said pole base and vertical surface and where said sloping surface contacts said sloping pole at a first point extending axially along said sloping pole,
a second supporting wall having a second planar supporting surface perpendicular to said first planar supporting surface and contacting said sloping pole at a second point substantially 90° from said first point.

19. A pole base assembly of claim 18, wherein:
said sloping surface has a length less than a length of said sloping pole and contacts said sloping pole at a bottom portion, said sloping surface having a width less than a diameter and greater than a radius of said sloping pole, and wherein said second supporting wall has a length equal to said first supporting wall and a width less than the diameter and greater than the radius of the sloping pole.

20. A pole base assembly of claim 19, further comprising:
a bottom surface coupled to and extending perpendicular to said first supporting wall and said second supporting wall, said bottom surface having a dimension at least equal to a bottom end of said sloping pole and supporting said sloping pole.

* * * * *